United States Patent
Banik et al.

(10) Patent No.: US 11,948,076 B2
(45) Date of Patent: Apr. 2, 2024

(54) MEDIA RENDERING DEVICE CONTROL BASED ON TRAINED NETWORK MODEL

(71) Applicant: SONY CORPORATION, Tokyo (JP)

(72) Inventors: Ananya Banik, Bangalore (IN); Ashish Agnihotri, Bangalore (IN); Ashritha Udyavar, Bangalore (IN); Madhvesh Sulibhavi, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 672 days.

(21) Appl. No.: 16/663,729

(22) Filed: Oct. 25, 2019

(65) Prior Publication Data
US 2021/0125054 A1    Apr. 29, 2021

(51) Int. Cl.
| | |
|---|---|
| *G06N 3/08* | (2023.01) |
| *G06F 3/14* | (2006.01) |
| *G06N 3/10* | (2006.01) |
| *G06V 40/16* | (2022.01) |
| G06N 3/04 | (2023.01) |
| H04N 21/4415 | (2011.01) |
| H04N 21/45 | (2011.01) |

(52) U.S. Cl.
CPC .............. *G06N 3/08* (2013.01); *G06F 3/14* (2013.01); *G06N 3/10* (2013.01); *G06V 40/168* (2022.01); *G06V 40/174* (2022.01); *G06N 3/04* (2013.01); *H04N 21/4415* (2013.01); *H04N 21/4532* (2013.01)

(58) Field of Classification Search
CPC ...................................................... G06N 3/08
USPC ........................................................ 706/23
See application file for complete search history.

(56) References Cited

U.S. PATENT DOCUMENTS

| | | | |
|---|---|---|---|
| 8,261,090 B1 | 9/2012 | Matsuoka | |
| 10,496,705 B1* | 12/2019 | Irani | ..................... H04L 51/18 |
| 2003/0108227 A1 | 6/2003 | Philomin et al. | |
| 2012/0266069 A1 | 10/2012 | Moshiri et al. | |
| 2016/0379041 A1* | 12/2016 | Rhee | ...................... G06K 9/00 382/118 |
| 2017/0169113 A1* | 6/2017 | Bhatnagar | ......... G06F 17/30867 |
| 2017/0374402 A1* | 12/2017 | Pogorelik | ........... H04N 21/4756 |

(Continued)

FOREIGN PATENT DOCUMENTS

| | | |
|---|---|---|
| CN | 103529931 A | 1/2014 |
| CN | 105282620 A | 1/2016 |

(Continued)

*Primary Examiner* — Ruay Ho
(74) *Attorney, Agent, or Firm* — CHIP LAW GROUP

(57) ABSTRACT

A media rendering device controlled based on a trained neural network is provided. The media rendering device captures an image of a user, and determines a user-type of the user and user-profile information of the user or the user-type based on the captured image. The user-type corresponds to an age group, a gender, an emotional state, and/or a geo-location, associated with the user. The user-profile information corresponds to interests or preferences of the user or the determined user-type. The media rendering device further determines device-assistive information based on application of the trained neural network model on the determined user-type. The media rendering device is further controlled based on the determined device-assistive information, to change at least one configuration setting of the media rendering device or to output media content.

18 Claims, 6 Drawing Sheets

(56) References Cited

U.S. PATENT DOCUMENTS

| | | | | |
|---|---|---|---|---|
| 2019/0179858 A1* | 6/2019 | Douze | ............... | G06F 16/951 |
| 2019/0222620 A1* | 7/2019 | Pather | ............... | H04L 20/06 |
| 2019/0324553 A1* | 10/2019 | Liu | ............... | G06F 3/017 |
| 2020/0274877 A1* | 8/2020 | Kwatra | ............... | H04L 43/04 |
| 2021/0012769 A1* | 1/2021 | Vasconcelos | ............... | G10L 15/22 |

FOREIGN PATENT DOCUMENTS

| | | |
|---|---|---|
| CN | 103546789 B | 7/2017 |
| CN | 109121007 A | 1/2019 |

\* cited by examiner

MEDIA RENDERING DEVICE CONTROL BASED ON TRAINED NETWORK MODEL

CROSS-REFERENCE TO RELATED APPLICATIONS/INCORPORATION BY REFERENCE

None.

FIELD

Various embodiments of the disclosure relate to a media rendering device. More specifically, various embodiments of the disclosure relate to an apparatus and a method for control of a media rendering device based on a trained network model.

BACKGROUND

Recent advancements in the field of media content reproduction have led to development of various techniques to control media rendering devices (for example, televisions and sound systems). Typically, a media rendering device may render media content to users who may have different interests and preferences. However, in certain situations, the media rendering devices may render the media content based on predefined rules or settings, which may be undesired for certain users. In certain other situations, the users may have to manually search for desired media content or manually modify the settings of the media rendering device. Due to paucity of time and challenges to manually operate the media rendering devices, the users may lose interest with the rendered content.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for control of a media rendering device based on a trained network model, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for automatic control of a media rendering device based on a network model, which may be trained for different types of users and related interests. Exemplary aspects of the disclosure provide a media rendering device (for example, a television, a display device, and a sound system) that may include circuitry which may be configured to capture a first image associated with a first user (for example, a viewer or listener of the media rendering device). Further, the circuitry may be configured to determine a user-type (for example, an age group, a gender, a location) of the first user based on the captured first image. The circuitry of the media rendering device may be further configured to determine user-profile information (for example, interests or preferences), which may be associated with one of the first user or the user-type of the first user, based on the captured first image. The circuitry of the media rendering device may be further configured to automatically control the media rendering device to at least change a configuration setting (for example, a display setting, a font setting, or an audio setting) of the media rendering device or to output first media content based on a neural network model stored in the media rendering device. The neural network model may be pre-trained based on the user-type and the user-profile information associated with the first user recognized in the captured image. This automatic control of the media rendering device based on the stored neural network (which may be trained based on the user-type and/or user profiles) may further enhance user's experience and engagement with the media rendering device.

The circuitry may be further configured to control the media rendering device to render the first media content for multiple users at the same time based on various factors such as, common interests of the users, a common user-type of the users, or a priority assigned to the users.

The circuitry may be further configured to capture a second image of the user based on the changed configuration setting or the rendered first media content. Based on an analysis of the captured second image of the user, the circuitry may determine an emotional state of the user and may further recommend second media content for the user based on the determined emotional state of the user. The second media content may be recommended to control the emotional state of the user (for example, convert a negative emotional state to a positive emotional state).

Figure 1:
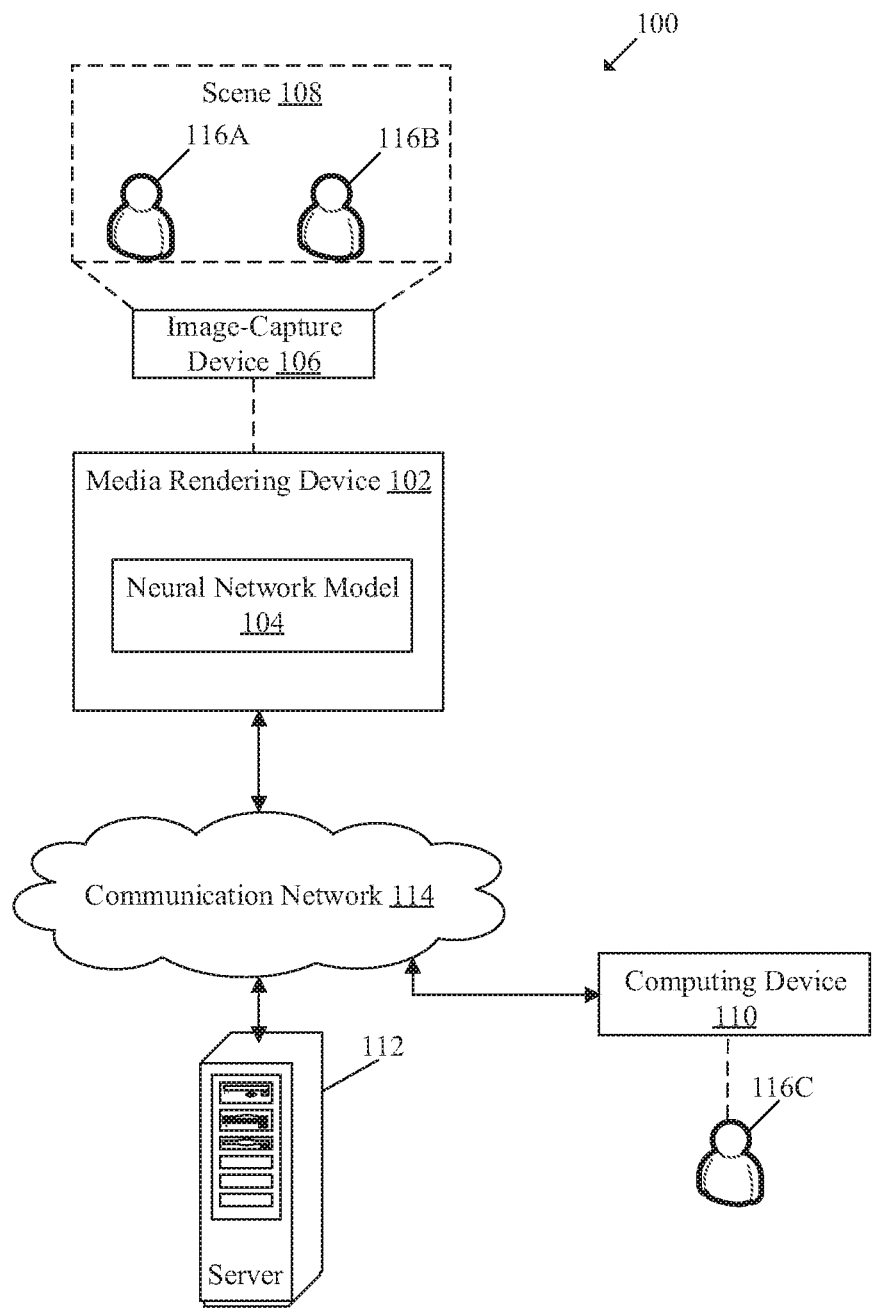
FIG. 1 is a block diagram that illustrates an exemplary network environment for control of a media rendering device based on trained network model, in accordance with an embodiment of the disclosure.

FIG. 1 is a block diagram that illustrates an exemplary network environment for control of a media rendering device based on a trained network model, in accordance with an embodiment of the disclosure. With reference to FIG. 1, there is shown a network environment 100. The network environment 100 may include a media rendering device 102, an image-capture device 106, a computing device 110, and a server 112. The media rendering device 102 may be coupled to the computing device 110 and the server 112, via a communication network 114. The media rendering device 102 may include a neural network model 104. The image-capture device 106 may be configured to capture an image of a scene 108 which may be within a field of view (FOV) of the image-capture device 106. As shown in FIG. 1, the media rendering device 102 may be associated with a first set of users (for example, a first user 116A and a second user 116B). In an embodiment, the scene 108 may include the first set of users (e.g., the first user 116A and the second user 116B). There is further shown a third user 116C who may be associated with the computing device 110. In accordance with an embodiment, at least one of the first user 116A and the second user 116B may be associated with the third user 116C. The image-capture device 106 may be communicatively coupled to the media rendering device 102. Although in FIG. 1, the image-capture device 106 is shown separated from the media rendering device 102, the disclosure is not so limited. Accordingly, in some embodiments, the image-capture device 106 may be integrated in the media rendering device 102, without a deviation from the scope of the disclosure.

The media rendering device 102 may comprise suitable logic, circuitry, interfaces, and/or code that may be configured to play back media content. The media rendering device 102 may be configured to communicate with the server 112 to receive the media content to be played back on the media rendering device 102. In accordance with an embodiment, the media rendering device 102 may be further configured to store the neural network model 104 that may be pre-trained based on a user-type of a user (e.g. the first user 116A and/or the second user 116B) and user-profile information associated with the user-type or the user. The media rendering device 102 may be configured to determine device-assistive information associated with the media rendering device 102 based on application of the stored neural network model on the user-type of a user (e.g., the first user 116A and/or the second user 116B). In accordance with an embodiment, the media rendering device 102 may be controlled based on the device-assistive information, to change to at least one configuration setting of the media rendering device 102 or to output the media content. Further, the media rendering device 102 may be configured to transmit a notification associated with the output media content to the computing device 110. Examples of the media rendering device 102 may include, but are not limited to, a television, a display device, a mobile phone, a smart phone, a tablet computing device, a personal computer, a gaming console, a media player, a sound system, a smart audio device, a home theatre system, a digital camera, a head-mounted device, an automotive electronic device, an electronic musical instrument, or other consumer electronic device with media rendering capability.

The neural network model 104 may include electronic data, for example, a software program, code of the software program, libraries, applications, scripts, or other logic or instructions for execution by a processing device, such as a processor or circuitry of the media rendering device 102. The neural network model 104 may be trained to determine device-assistive information based on the user-type (i.e. age group, gender, location) of the user and the user profile information (preferences or interests) associated with the user or the user-type. Additionally, or alternatively, the neural network model 104 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

Examples of the neural network model 104 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some embodiments, the neural network model 104 may include numerical computation techniques using data flow graphs. For example, the neural network model 104 may use an association between the device assistive information and the user-type and/or the user profile information for the user (for example, the first user 116A and/or the second user 116B). In certain embodiments, the neural network model 104 may be based on a hybrid architecture of multiple Deep Neural Networks (DNNs).

The image-capture device 106 may comprise suitable logic, circuitry, interfaces, and/or code that may be configured to capture one or more images of the scene 108. In accordance with an embodiment, the image-capture device 106 may capture the one or more images on receipt of one or more control instructions from the media rendering device 102. The one or more images may correspond to the scene 108 within the FOV of the image-capture device 106. The scene 108 may include one or more users associated with (or currently viewing) the media rendering device 102, such as, the first user 116A and the second user 116B. Examples of the image-capture device 106 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The computing device 110 may comprise suitable logic, circuitry, interfaces, and/or code that may be configured to receive a notification associated with the media content from the media rendering device 102. The computing device 110 may be an electronic device that may be associated with a user (such as, the third user 116C, or one of the first user 116A or the second user 116B). Examples of the computing device 110 may include, but are not limited to, a mobile phone, a smart phone, a tablet computing device, a computer workstation, a gaming console, a head-mounted device, an automotive electronic device, or other consumer electronic device.

The server 112 may comprise suitable logic, circuitry, interfaces, and/or code that may be configured to communicate with the media rendering device 102 and/or the computing device 110, via the communication network 114. The server 112 may be configured to store the media content for distribution to computing devices (such as the media rendering device 102 or the computing device 110). In accordance with an embodiment, the server 112 may be configured to distribute, configuration settings, the media content, and software updates to the media rendering device 102 and the computing device 110. Further, the server 112 may store the trained neural network model 104 and transmit the trained neural network model 104 to the media rendering device 102. In addition, the server 112 may store the user profile information related to the first user 116A and/or the second user 116B. The server 112 may be configured to transmit the trained neural network model 104, the user profile information and the media content to the media rendering device 102, based on a request received from the media rendering device 102. Examples of the server 112 may include, but are not limited to, an application server, a cloud server, a mainframe server, a database server, a file server, a web server, or other types of servers.

The communication network 114 may include a communication medium through which the media rendering device 102, the computing device 110, and the server 112 may communicate with each other. Examples of the communication network 114 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the media rendering device 102 may be configured to store the neural network model 104. The stored neural network model 104 may be pre-trained based on a user-type (e.g., gender, age group, a geo-location) of a user (for example, the first user 116A) and user-profile information (e.g., interests and preferences related media content and configuration settings) associated with the user-type or the first user 116A. The neural network model 104 may be configured to determine first device-assistive information associated with the media rendering device 102 based on application of the trained neural network model 104 on the user-type of the first user 116A.

In accordance with an embodiment, the media rendering device 102 may be configured to capture, using the image-capture device 106, a first image of the first user 116A, which may be present within the scene 108 captured by the image-capture device 106. The media rendering device 102 may be further configured to determine the user-type of the first user 116A based on the captured first image. The user-type of the first user 116A may correspond to, but is not limited to, at least one of an age group, a gender, an emotional state, or a geographical location, associated with the first user 116A. The process of determination of the user-type from the captured first image is described, for example, in FIG. 3A. Further, the media rendering device 102 may be configured to determine the user-profile information, which may be associated with one of the first user 116A or the user-type of the first user 116A, based on the captured first image. The user-profile information may correspond to, but is not limited to, at least one of a media content interest, a media genre interest, a celebrity interest, a preference related to a configuration setting of the media rendering device, a time of day preference associated with media playback, previously played media content, or a preference associated with another media rendering device.

In accordance with an embodiment, the media rendering device 102 may control the trained neural network model 104 to determine first device-assistive information associated with the media rendering device 102. For instance, the neural network model 104 may determine the first device-assistive information based on the application of the trained neural network model 104 on the determined user-type of the first user 116A. The first device-assistive information may further correspond to, but is not limited to, at least one of a set of instructions, Uniform Resource Locator (URL), address information of a memory associated with the media rendering device, notification information, one or more hardware configuration parameters, or one or more software configuration parameters. The details of the first device-assistive information are described, for example, in FIGS. 3A and 3B. The media rendering device 102 may be further controlled, based on the determined first device-assistive information, to change at least one configuration setting of the media rendering device 102 or to output first media content. Examples of the at least one configuration setting of the media rendering device 102 may include, but are not limited to, a display setting, a GUI/menu setting, a home page setting, a font setting, a color setting, network setting, security setting, an accessibility setting, an audio setting, a hardware setting, or a software setting associated with the media rendering device 102. The control of the media rendering device 102 based on the first device-assistive information is described, for example, in FIGS. 3A and 3B. Thus, the disclosed media rendering device 102 provides automatic recommendation of the first media content or control of the configuration setting based on the stored neural network model 104 which may be trained for different user-types and the user profile information (as personalized information) for different users.

Figure 2:
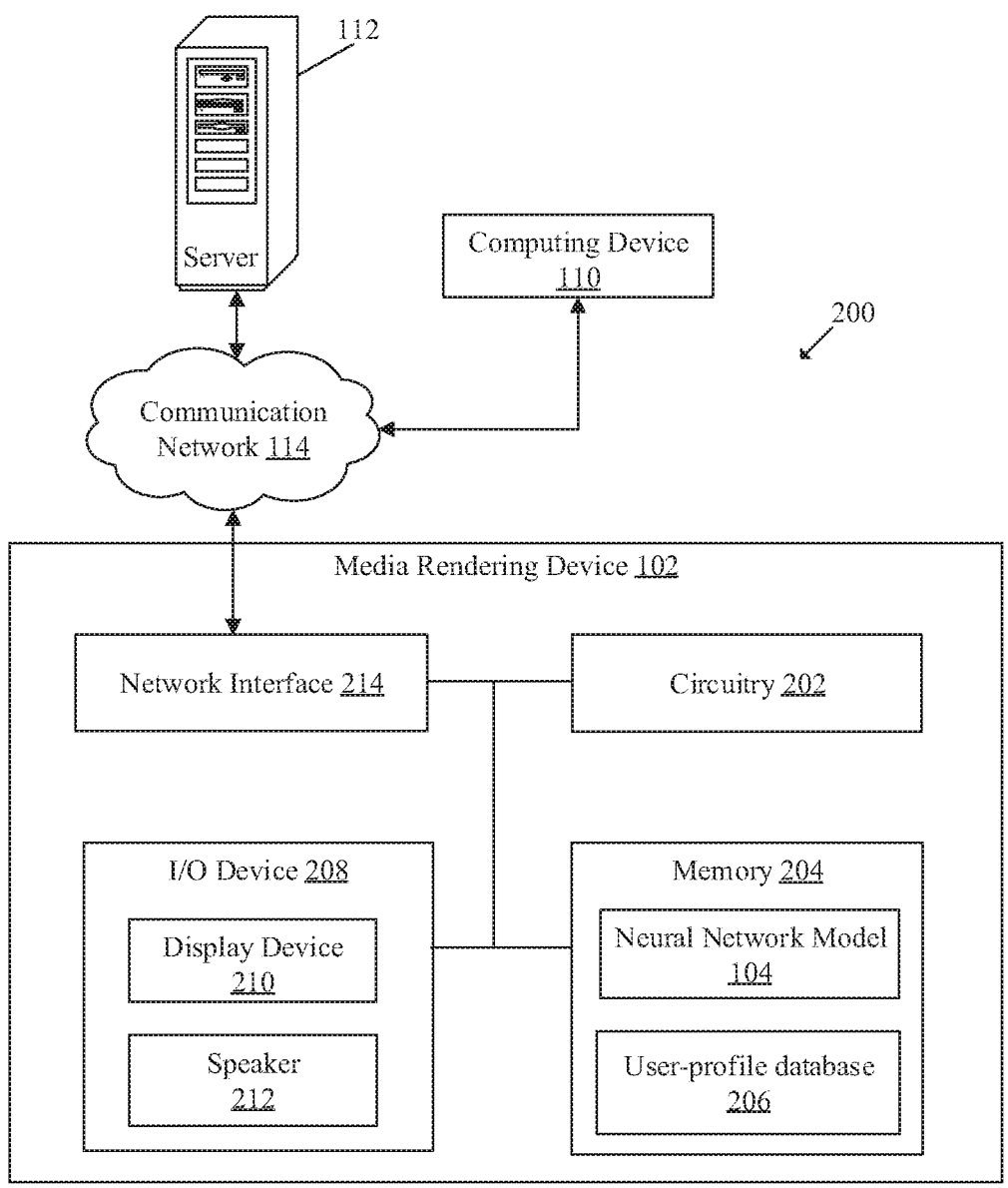
FIG. 2 is a block diagram that illustrates an exemplary media rendering device, in accordance with an embodiment of the disclosure.

FIG. 2 is a block diagram that illustrates an exemplary media rendering device, in accordance with an embodiment of the disclosure. FIG. 2 is explained in conjunction with elements from FIG. 1. With reference to FIG. 2, there is shown a block diagram 200 of the media rendering device 102. The media rendering device 102 may include circuitry 202. The media rendering device 102 may further include a memory 204 which may be configured to store the neural network model 104. In addition, the memory 204 may also be configured to store a user-profile database 206 that may include the user-profile information of one or more users (e.g. the first user 116A and the second user 116B) associated with the media rendering device 102. Further, the media rendering device 102 may include an I/O device 208 that may include a display device 210 and a speaker 212. The media rendering device 102 may further include a network interface 214, through which the media rendering device 102 may be connected to the communication network 114.

The circuitry 202 may include suitable logic, circuitry, interfaces, and/or code that may be configured to execute program instructions associated with different operations to be executed by the media rendering device 102. For example, some of the operations may include playback of the first media content, control of the image-capture device 106, determination of the device-assistive information associated with the media rendering device 102 based on application of the trained neural network model 104, and control of the I/O device 208 of the media rendering device 102 to change to at least one configuration setting of the media rendering device 102 or to output the first media content. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the one or more instructions to be executed by the circuitry 202. The memory 204 may be configured to store the neural network model 104. The memory 204 may be further configured to store the user-profile database 206 that may include the user-profile information, facial image information, user-type information, priority information of the one or more users (such as, the first user 116A and the second user 116B) associated with the media rendering device 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may comprise suitable logic, circuitry, interfaces, and/or code that may be configured to receive an input and provide an output based on the received input. The I/O device 208 may include various input and output devices, which may be configured to communicate with the circuitry 202. Examples of the I/O device 208 may include, but are not limited to, a touch screen, a keyboard, a mouse, a joystick, a display device (for example, the display device 210), a microphone, or a speaker (for example, the speaker 212).

The display device 210 may comprise suitable logic, circuitry, and interfaces that may be configured to display an output of the media rendering device 102. The display device 210 may be utilized to render the first media content. In some embodiments, the display device 210 may be an external display device associated with the media rendering device 102. The display device 210 may be a touch screen which may enable a user to provide a user-input via the display device 210. The touch screen may be at least one of a resistive touch screen, a capacitive touch screen, a thermal touch screen or any other touch screen using which inputs can be provided to the display device 210 or the circuitry 202. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display.

The speaker 212 may include suitable logic, circuitry, and interfaces that may be configured to playback an audio output associated with the first media content. The speaker 212 may be configured to receive electrical audio signals from the circuitry 202 and convert the received electrical audio signals into the audio/sound output. In some embodiments, the speaker 212 may be integrated with the media rendering device 102 and may be an internal component of the media rendering device 102. In some embodiments, the speaker 212 may be positioned outside the media rendering device 102. Examples of the speaker 212 may include, but are not limited to, a loudspeaker, a woofer, a sub-woofer, a tweeter, a wireless speaker, a monitor speaker, or other speakers or sound output devices.

The network interface 214 may comprise suitable logic, circuitry, interfaces, and/or code that may be configured to facilitate communication between the media rendering device 102, the server 112 and/or the computing device 110, via the communication network 114. The network interface 214 may be implemented by use of various known technologies to support wired or wireless communication of the media rendering device 102 with the communication network 114. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 214 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operations of the circuitry 202 are described, for example, in FIGS. 3A, 3B, 4, 5, and 6.

Figure 3A:
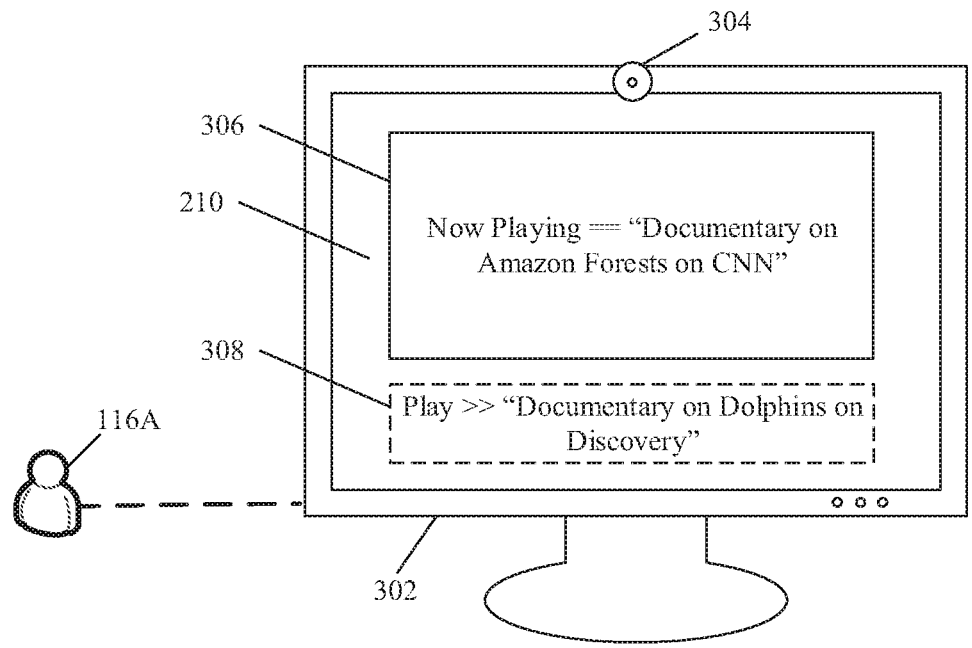
FIGS. 3A and 3B, collectively is a diagram that illustrates an exemplary scenario for control of a media rendering device based on trained network model, in accordance with an embodiment of the disclosure.
Figure 3B:
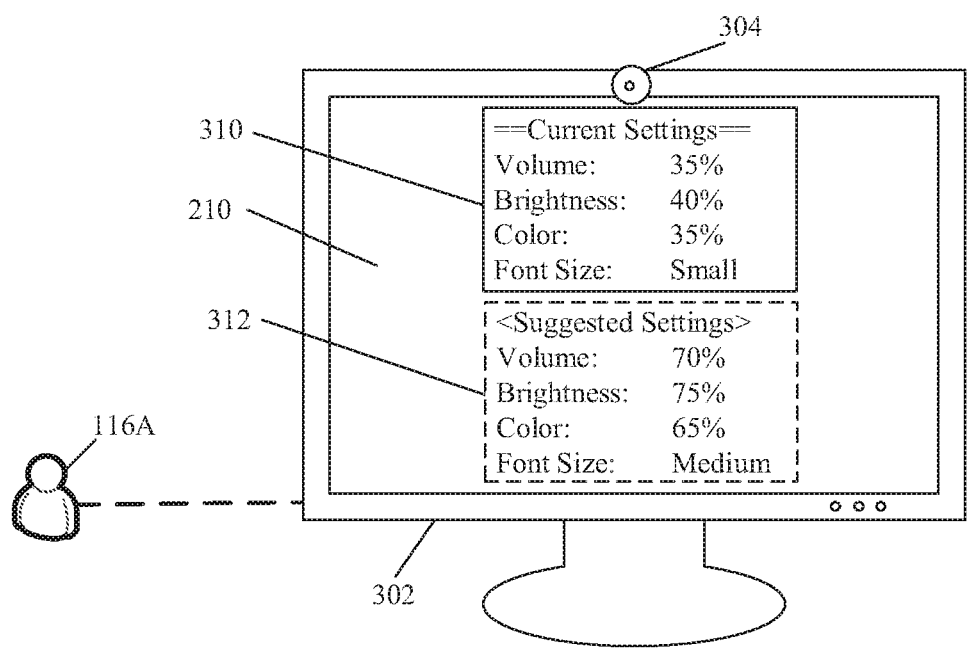

FIGS. 3A and 3B, collectively is a diagram that illustrates an exemplary scenario for control of a media rendering device based on a trained network model, in accordance with an embodiment of the disclosure. FIGS. 3A and 3B are explained in conjunction with elements from FIGS. 1 and 2. With reference to FIG. 3A, there is shown a media rendering device 302 (for example, a television (TV)), and an image-capture device 304 (for example, a camera). In an embodiment, the functionality of the media rendering device 302 and the image-capture device 304 may be similar to the functionalities of the media rendering device 102 and the image-capture device 106, described in FIG. 1. Therefore, the description of the media rendering device 302 and the image-capture device 304 is omitted from the disclosure for the sake of brevity. The image-capture device 304 may be integrated with the media rendering device 302 as shown in FIG. 3A.

In FIG. 3A, there is further shown a user (for example, the first user 116A) associated with the media rendering device 302. The first user 116A may be present in a field-of-view (FOV) of the image-capture device 304 associated with the media rendering device 302. It may be noted that, the media rendering device 302 and the image-capture device 304, shown in FIG. 3A are presented merely as an example. The present disclosure may be also applicable to other types of the media rendering device 302 and the image-capture device 304. A description of other types has been omitted from the disclosure for the sake of brevity.

With reference to FIG. 3A, the circuitry 202 of the media rendering device 302 may be configured to capture a first image of the first user 116A using the image-capture device 304. Thereafter, the circuitry 202 may detect the first user 116A in the captured first image using object detection techniques known in the art. Based on the detection of the first user 116A in the captured first image, the circuitry 202 may determine a facial region of the first user 116A in the captured first image using one or more facial detection/recognition techniques. In an embodiment, the circuitry 202 may be configured to identify the first user 116A in the captured first image based on a comparison of the captured first image and the facial image information (stored in the user-profile database 206) for the first user 116A. In some embodiments, the circuitry 202 may control the neural network model 104 to identify the first user 116A from the captured first image of the first user 116A.

In an embodiment, the circuitry 202 may be further configured to determine a user-type of the first user 116A, based on the captured first image and/or the identification of the first user 116A. For example, the user-type of the identified first user 116A may be determined based on information stored about the first user 116A in the user-profile database 206. The user-type of the first user 116A may correspond to, but is not limited to, an age group, a gender, an emotional state, or a geographical location, associated with the first user 116A. In an embodiment, the circuitry 202 may apply one or more image processing techniques on the facial region to determine the user-type of the first user 116A based on facial characteristics of the first user 116A in the determined facial region. For example, the circuitry 202 may determine the age group of the first user 116A based on detection of lines, folds, or wrinkles on the facial region of the first user 116A detected in the captured first image. Further, the circuitry 202 may determine the gender of the first user 116A based on application of a Gabor filter on the facial region in the captured first image. In some embodiments, the circuitry 202 may control the neural network model 104 to determine the gender of the first user 116A based on the application of the neural network model 104 on the captured first image or on the determined facial region in the captured first image.

In addition, the circuitry 202 may determine the emotional state of the first user 116A as a positive emotion (for example, a happy emotion, a smiling motion, a laughing emotion, or an excited emotion) or a negative emotion (for example, a sad emotion, an angry emotion, a fear emotion, a confused emotion, a stressed emotion, or a scared emotion) based on comparison of facial characteristics in the facial region with predefined template images associated with the positive and the negative emotions stored in the memory 204. The circuitry 202 may determine the geographical location (i.e. geo-location) of the first user 116A based on analysis of the facial region of the captured first image with respect to predefined template images of individuals who may belong to different geographical regions. Alternatively, the image-capture device 304 or the media rendering device 302 may include an integrated Global Positioning System (GPS) sensor and may tag the captured first image based on the geographical location determined by the GPS sensor. The circuitry 202 may determine the geographical location (i.e. geo-location) of the first user 116A based on the tagged geo-location information within the captured first image of the first user 116A. In some embodiment, the circuitry 202 may directly determine the geographical location at the time of capture of the first image without the first image being tagged.

The circuitry 202 may be further configured to determine user-profile information, associated with one of the first user 116A or with the determined user-type of the first user 116A, based on the captured first image. The user-profile information may indicate different preferences or interests related to the first user 116A or the determined user-type of the first user 116A. Examples of the user-profile information may include, but are not limited to, a media content interest, a media genre interest, a celebrity interest, a preference related to a configuration setting of a media rendering device (e.g., the media rendering device 302), a time of day preference associated with media playback, previously played media content, or a preference associated with another media rendering device such as the computing device 110. For example, the media content interest may correspond to a favorite show or TV series watched frequently by the first user 116A. The media genre interest may correspond to a genre of media content preferred by the first user 116A, such as, but is not limited to, romance, comedy, action, family, thrillers, musicals, or animation. The celebrity interest may correspond to a celebrity liked by the first user 116A, such as, but is not limited to, a sports person, an actor, a singer, or a politician.

In accordance with an embodiment, the determination of the user-profile information may be based on the identification of the first user 116A. For example, in case the first user 116A is registered with the media rendering device 302, the circuitry 202 may be able to identify the first user 116A based on the captured first image. In the case of the registered first user 116A, the user profile information of the first user 116A may be determined from the user-profile database 206 for the first user 116A. Alternatively, in case the first user 116A is non-registered with the media rendering device 302, the user-profile information may be determined based on the determined user-type of the first user 116A. Further, in case the first user 116A is non-registered with the media rendering device 302, the circuitry 202 may be configured to initiate registration of the first user 116A with the media rendering device 302 based on receipt of details (such as, but is not limited to, username, age, gender, or location) input from the first user 116A and based on capture of a facial image of the first user 116A. The input details and the captured image may be stored in the user-profile database 206 to complete the registration of the first user 116A.

In accordance with an embodiment, the memory 204 may store the neural network model 104, which may be trained for the determined user-profile information and the determined user type for the first user 116A or other users of the media rendering device 302. For example, the circuitry 202 may monitor media content viewing history or configuration setting history of the first user 116A or other users over a period of time and may learn the media content or configuration settings interests or preferences (as the user-profile information) for the first user 116A or other users. The circuitry 202 may learn the media content or configuration settings interests or preferences (i.e. user-profile information) for different user-types (i.e. age group, gender, emotions, locations) of the users based on the monitored media content viewing history or configuration setting usage history. The circuitry 202 may be configured to store the learned interests and preferences for the media content or the configuration settings for different user-types as the user profile information in the user-profile database 206. The circuitry 202 may further train the neural network model 104 based on the different user-types (e.g., age, gender, emotions, and location) and the user-profile information (e.g., the media content or the configuration setting interests or preferences) of the first user 116A or other registered users. Thus, the circuitry 202 may be configured to automatically determine the preferred media content or configuration setting based on the application of the trained neural network model 104 on the user-type or the user-profile information (as the personalized information) of the first user 116A, which may be automatically determined based on the captured image of the first user 116A.

In accordance with an embodiment, the circuitry 202 may be further configured to determine first device-assistive information associated with the media rendering device 302. The circuitry 202 may be configured to determine the first device-assistive information based on application of the trained neural network model 104 on the determined user-type of the first user 116A or the determined user-profile information. The first device-assistive information may assist or control the media rendering device 302 to determine or access the preferred first media content or configuration setting for the determined user-type or the user-profile information for the first user 116A. The first device-assistive information may correspond to, but is not limited to, a set of instructions to render or access the first media content, a Uniform Resource Locator (URL) to fetch the first media content from the server 112 or internet, or memory address information of the memory 204 that may store the first media content. The first device-assistive information may also correspond to notification information. that may be related to the first media content. to be provided to the first user 116A. The notification information may be rendered on the media rendering device 302 or transmitted to the computing device 110. In some embodiments, the first device-assistive information may also correspond to one or more hardware configuration parameters of the media rendering device 302, or one or more software configuration parameters of the media rendering device 302. The one or more hardware or software configuration parameters may be related to different configuration settings of the media rendering device 302. For example, for a display setting as the configuration setting of the media rendering device 302, the one or more hardware configuration parameters in the first device-assistive information may indicate, for example, a brightness level, a contrast level, or a resolution value of the display setting. In another example, for the software setting as the configuration setting of the media rendering device 302, the one or more software configuration parameters in the first device-assistive information may indicate, for example, a version of software/firmware to be downloaded or recommended, storage space, or automatic/manual updates.

In accordance with an embodiment, the circuitry 202 may be further configured to control the media rendering device 302 based on the determined first device-assistive information, to change at least one configuration setting of the media rendering device 302 or to output the first media content. Examples of the first media content may include, but are not limited to, audio content, textual content, video content, audio-video (AV) content, multimedia content, animated content, or an interactive content (like quiz content). For example, as shown in FIG. 3A, the display device 210 of the media rendering device 302 may render media content 306, such as, "Now-Playing—Documentary on Amazon Forests on CNN channel". For instance, the media content 306 may correspond to a first program associated with a currently selected channel on the media rendering device 302. In accordance with an embodiment, based on the determined first device-assistive information (i.e. determined based on the application of the neural network model 104), the circuitry 202 may be configured to recommend the first media content to be output on the display device 210 of the media rendering device 302. For example, the recommended first media content may correspond to a second program (i.e. different from the first program) which may be associated with another channel. For example, as shown in FIG. 3A, the display device 210 of the media rendering device 302 may display a notification/URL 308 (as the first device-assistive information) associated with the recommended first media content (such as, "Documentary on Dolphins" on "Discovery channel"). In accordance with an embodiment, the circuitry 202 may control the display device 210 of the media rendering device 302 to display the notification/URL 308 (associated with the recommended first media content) as a pop-up message on the display device 210. In some embodiments, the circuitry 202 may control the display device 210 to directly display the recommended first media content (for example, "Documentary on Dolphins" on "Discovery channel") based on the determined first device-assistive information (i.e. the notification/URL 308). In such case, the first device-assistive information may be a channel number (for example, Discovery channel) to render the first media content. In some embodiments, the first device-assistive information may be URL of the server 112 from where the first media content has to be retrieved.

In an exemplary scenario, in case, the circuitry 202 determines the user-type of the first user 116A, as a male in the age group of 15-25 years with a smiling emotion, from the first image captured by the image-capture device 304, the circuitry 202 may further determine the user-profile information for the determined user-type. The circuitry 202 may determine the user-profile information from the memory 204 (or from the trained neural network model 104) for the determined user-type. For example, for the user-type as the male in the age-group of 15-25 years, the user-profile information may indicate interests or preferences for sports events, rock music, or action movies. The circuitry 202 may further input the determined interests or preferences (such as, sports, rock music, action movies) as the user-profile information to the trained neural network model 104 to output the first device-assistive information. In some embodiments, the circuitry 202 may input the determined user-type (such as, information as the male in the age-group of 15-25 years) to the trained neural network model 104 to output the first device-assistive information. The first device-assistive information may indicate, for example, a memory location of the memory 204, a URL of server 112/internet from where the first media content can be retrieved. The first media content may be a recommended media content associated with the sports event (e.g., football), a rock-music concert video, and/or an action movie for the first user 116A as the male of age-group of 15-25 years. Thus, the circuitry 202 may control the media rendering device 302 to output the first media content (for example, the sport match, rock-music video, or action movie) on the display device 210 for the first user 116A, based on the first device-assistive information which may be determined based on the application of the trained neural network model 104 on the user-type (such as, male in the age group of 15-25 years) or the user-profile information (content interests or preferences for the sports, rock music, or action movies).

In another exemplary scenario, in case the user-type of the first user 116A is a female in the age group of 50-65 years with a sad emotion, the circuitry 202 may recommend media content associated with a romantic-comedy program, as the first media content for the first user 116A. In yet another exemplary scenario, in case the user-type of the first user 116A is a male in the age group above 65 years, the circuitry 202 may automatically recommend a news feature or a documentary program as the first media content based on the application of the trained neural network model 104 on the determined user-type. In yet another example, in case, the user-type of the first user 116A is a particular geographical location, the circuitry 202 may automatically determine or recommend the first media content relevant for the determined geographical location. In some embodiments, the circuitry 202 may identify the first user 116A from the captured image, and automatically determine the first media content based on the neural network model 104 trained for interests/preferences/viewing history (i.e. user-profile information) of the identified first user 116A. For example, in case, the media content interest for the first user 116A is for a comedy genre (i.e. user profile information), then the circuitry 202 may automatically determine or recommend the first media content of the comedy genre, based on the application of the trained neural network model 104 on the media content interest of the first user 116A identified in the first image captured by the image-capture device 304.

In accordance with an embodiment, the circuitry 202 may be configured to select the first media content from a plurality of second media content to render on the media rendering device 302. For example, the circuitry 202 may select a program associated with a TV channel as the first media content, from a list of programs (i.e. the plurality of second media content) associated with different TV channels. The circuitry 202 may select the first media content from the plurality of second media content based on different factors which may be based on at least one of, but not limited to, a popularity rating of the first media content, a Television Rating Point (TRP) rating of the first media content, a current time of day, or a geographical location of the first user 116A. In addition to the selection of the first media content from the plurality of second media content, the circuitry 202 may be configured to render a sorted list of the plurality of second media content including the first media content on the media rendering device 302. The sorted list may be based on a degree of popularity of each media content in the plurality of second media content. For instance, the circuitry 202 may sort programs associated with different TV channels in order of their popularity and may render the selected first media content (recommended TV program) on top position of the sorted list of TV programs on the media rendering device 302.

In some embodiments, the circuitry 202 may render different TV shows/movies (i.e. the first media content) with high or good TRP ratings corresponding to the geographical location/region of the first user 116A. In addition, the circuitry 202 may output to the first user 116A different TV programs that may be of interest to the first user 116A, such as, favorite or frequently watched TV programs associated with the first user 116A. For instance, the circuitry 202 may control the display device 210 to display notifications about the first media content as pop-up messages on the media rendering device 302, when the first user 116A may be viewing another media content (for example as shown in FIG. 3A). In some embodiments, the circuitry 202 may transmit the notifications about the recommended first media content to the computing device 110 when the first user 116A may not be in field-of-view (FOV) of the image-capture device 304 of the media rendering device 302). The notification may correspond to, but is not limited to, an electronic message (i.e. e-mail) or a short messaging service (SMS) message. The computing device 110 (for example, a mobile phone) may be associated with the first user 116A or with the third user 116C (for example, parent or guardian of the first user 116A).

In accordance with an embodiment, the circuitry 202 may be configured to control at least one configuration setting of the media rendering device 302 based on the determination of the first device-assistive information. With reference to FIG. 3B, there is shown an exemplary set of current configuration parameter values 310 that may be associated with the at least one configuration setting of the media rendering device 302. Based on the determination of the first device-assistive information, the circuitry 202 may be configured to suggest a recommended set of configuration parameter values 312, as shown in FIG. 3B, that may be associated with the at least one configuration setting of the media rendering device 302. The circuitry 202 may determine the recommended set of configuration parameter values 312 based on the first device-assistive information, which may be determined based on the application of the trained neural network model 104 on the determined user-type or the user-profile information of the first user 116 present in the FOV of the image-capture device 304 as described, for example, in FIG. 3A. Examples of the at least one configuration setting of the media rendering device 302 may include, but are not limited to, a display setting, a GUI/menu setting, a home page setting, a font setting, a color setting, network setting, security setting, an accessibility setting, an audio setting, a hardware setting, or a software setting, associated with the media rendering device 302. Examples of the display setting may include, but are not limited to, a screen resolution setting, an aspect ratio setting, a picture mode, a backlight setting, or a brightness setting of the media rendering device 302. Further, the GUI/menu setting may correspond to a setting related to configuration of GUI elements or one or more menus of the media rendering device 302. The home page setting may correspond to a preference related to an arrangement of UI elements and menus on a home page/screen of the media rendering device 302. The font setting may correspond to, but is not limited to, a font size, a font style, or a font color of the GUI of the media rendering device 302. Further, the color setting may include, but is not limited to, a hue setting, a gamma setting, a tint setting, a color contrast setting, a color warmth setting, or a color balance setting of the GUI of the media rendering device 302. In addition, the network setting may include, but is not limited to, an IP-address setting, a network security setting, a network topology setting, or a preferred network for the media rendering device 302. Further, the security setting may include, but is not limited to, a user-privacy setting, a parental control setting, or a user account setting of the media rendering device 302. The user-privacy setting may further include a group-privacy setting which may be associated with a group of people having common characteristics, for example (common age group (such as children between 8-12 age group, adults above 60 years), a group of men, a group of women). The group privacy setting may be applicable or beneficial to corresponding group when common media content or program may be rendered or switched for the corresponding group. In addition, the accessibility setting may include, but is not limited to, a voice guide setting, a voice-based scene description setting, a closed caption setting, a gesture setting, a shortcut setting, or a color inversion setting of the media rendering device 302. Further, the audio setting may include, but is not limited to, a volume setting, an audio balance setting, an audio effect setting, a microphone setting, a speaker setting, or an equalizer setting of the media rendering device 302.

For example, as shown in FIG. 3B, the configuration settings of the media rendering device 302 may be based on the exemplary set of current configuration parameter values 310 which may include "Volume: 35%"; "Brightness: 40%"; "Color: 35%"; and "Font Size: Small". In case, the circuitry 202 determines the user-type of the first user 116A (in the FOV of the image-capture device 304) as an aged user (e.g., a user with age over 65 years), the circuitry 202 may determine the user-profile information (interests or preferences of configuration settings) for the aged-user. The circuitry 202 may further apply the trained neural network model 104 on the determined user-type (i.e. aged user) or on the determined user-profile information (i.e. brighter display and large font size) to determine the first device-assistive information. In some embodiments, the first device-assistive information may indicate the recommended set of configuration parameter values 312 which may be, for example, "Volume: 70%"; "Brightness: 75%"; "Color: 65%"; and "Font Size: Medium" as shown in FIG. 3B. The recommended set of configuration parameter values 312 may be higher than the current set of configuration parameter values 310 as shown in FIG. 3B so the first user 116 (for example with the user-type as aged user) may effectively view the media content displayed on the media rendering device 302. In accordance with an embodiment, the circuitry 202 may be configured to automatically control the configuration settings (for example, display setting, font setting, audio setting) of the media rendering device 302 based on the determined first device-assistive information (i.e. recommended set of configuration parameter values 312 shown in FIG. 3B). Thus, the circuitry 202 may automatically control at least one configuration setting of the media rendering device 302 based on recommended set of configuration parameter values 312, which may be determined based on the neural network model 104 trained on the user-type or on the user-profile information associated with the first user 116A. It may be noted that the recommended set of configuration parameter values 312 shown in FIG. 3B is presented merely as an example of the first device-assistive information. The present disclosure may be also applicable to other configuration parameter values 312 for different user-types (i.e. age, gender, emotion, locations) or the user-profile information (different interest and preferences for configuration setting). A description of other configuration parameter values for different user-types and user-profile information has been omitted from the disclosure for the sake of brevity.

In accordance with an embodiment, the circuitry 202 may be further configured to capture a second plurality of images associated with the first user 116A over a period of time, based on the control of the media rendering device 302 (either to output the first media content or change the configuration setting) based on the first device-assistive information. In an embodiment, the media rendering device 302 may control the image-capture device 304 to capture the second plurality of images of the first user 116A, over a specified time period. The circuitry 202 may be further configured to determine an emotional state (or mood) of the first user 116A based on the captured second plurality of images. The emotional state may be determined based on comparison between the facial expressions of the first user 116A in the captured second plurality of images and the sample facial image information stored in the user-profile database 206.

In some embodiments, the facial expression may indicate one or more motions or positions of muscles of a face of the first user 116A, where the facial expressions may manifest an emotion. The muscles of the face may move the skin of the first user 116A, may create facial lines/folds, or may cause the movement of facial features, such as mouth, head, nose, eye, eyebrows of the first user 116A. The circuitry 202 may be configured to determine the emotional state of the first user 116A based on the determined facial expression of the first user 116A. The plurality of categories of emotional state may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion. The circuitry 202 may determine the emotional state of the first user 116A based on the output first media content or change in the configuration setting based on the first device-assistive information, to determine a reaction of the first user 116 (for example, whether the first user 116 liked the output first media content or changed configuration settings or not).

In an embodiment, the circuitry 202 may be further configured to determine second device-assistive information based on the application of the trained neural network model 104 on the determined emotional state of the first user 116A. Further, the circuitry 202 may be configured to control the media rendering device 302 based on the second device-assistive information, to change the at least one configuration setting of the media rendering device 302 or to render second media content (different from the first media content) on the media rendering device 302. The second media content may be rendered on the media rendering device 302 (as described, for example, in FIG. 3A) or at least one configuration setting of the media rendering device 302 may be changed (as described for example, in FIG. 3B). The circuitry 202 may render the second media content (i.e. different from the first media content), in case the captured second plurality of images may indicate a negative emotional state (for example, sad emotion, boring emotion, angry emotion, confused emotion, a stressed emotion, or irritation emotion) of the first user 116 after the render of the first media content. The circuitry 202 may render the second media content or again change the configuration setting to convert the negative emotional state of the first user 116A to the positive emotional state (for example, happy emotion, smiling emotion, excitement emotion).

For example, consider that the first user 116A is a 20 years old male person and the media rendering device 302 renders a news show (for example political) as the first media content for the first user 116A. The first user 116A may have a media interest related to sports news or sports events. Based on the render of the news show, which may not include sports related news, the first user 116A may demonstrate the negative emotional state and may not be interested in the rendered first media content. Based on determination of the negative emotional state of the first user 116A, the circuitry 202 may render the second media content (i.e., a sports event) to convert the emotional state from negative to positive.

In another exemplary scenario, consider that the first user 116A is an old-aged person (e.g., over 65 years old) and that the media rendering device 302 may control the configuration setting with "Medium" font size as one of the recommended configuration settings of the media rendering device 302. In case, the emotional state of the first user 116A may be detected as a negative emotional state (for example, an angry emotional state), the circuitry 202 may change or adjust the configuration setting or recommended font size of the media rendering device 302 to "Large" font size for the first user 116A to convert the emotional state from negative to positive. In another exemplary scenario, based on the controlled configuration setting for the first user 116A (for example old-aged user), the circuitry 202 may detect change in eye's state of the first user 116A based on the captured second plurality of images. The changed eye's state may indicate that the first user 116A (for example old-aged user) may be having certain difficulties to view the rendered first media content with the controlled configuration setting (for example with "Medium" font size). In such case, the circuitry 202 may change or adjust the configuration setting or recommended another font size of the media rendering device 302 for the first user 116A. In another exemplary scenario, based on the controlled configuration setting for the first user 116A (for example old-aged user), the circuitry 202 may detect a change in distance between the first user 116A and the media rendering device 302 based on the captured second plurality of images. In a case, based on the detection that the first user 116A (for example old-aged user) comes closer to the media rendering device 302 to view the rendered first media content with the controlled configuration setting (for example with "Medium" or "Small" font size), then the circuitry 202 may change or adjust the configuration setting or recommended another font size of the media rendering device 302 (say "Large" font size) for the first user 116A such that the first user 116A may easily view the render content.

The disclosed media rendering device 302 may continuously monitor the emotional state, eye's state, or change in distance for the first user 116A based on the output of the first media content or change in the configuration setting to further determine a media content or configuration setting which may be best suited for the first user 116A. In some embodiments, the media rendering device 302 may detect hand-gesture (for example "Ok" sign, "thumb-up" sign, "thumb-down" sign, "clap" sign) of the first user 116A to detect whether the first user 116 prefers or likes the output first media content or the changed configuration setting. The disclosed media rendering device 302 may further control the output of the first media content or change the configuration setting based on the detected hand-gesture of the first user 116A. Thus, the disclosed media rendering device 302 provides two-way interaction between the media rendering device 302 and the user to automatically identify best suited media content or configuration setting for the users. In some embodiments, the circuitry 202 of the media rendering device 302 may recommend multiple media content options (such as a list of media content options) to the first user 116A, based on the determined user-type or user-profile information of the first user 116A. The circuitry 202 may receive user-inputs, via the I/O device 208, from the first user 116A to select one of the preferred or liked media content from the multiple media content options provided to the first user 116A.

In accordance with an embodiment, the circuitry 202 may re-train the neural network model 104 based on the determined emotional state of the first user 116A and the second media content or the changed configuration setting, for which the emotional state may be positive. Further, the circuitry 202 may be configured to update the user-profile information (i.e. associated with the first user 116A) in the user-profile database 206 and re-train the neural network model 104 based on the determined second device-assistive information. In the above example of 20 years old male as the user-type, the recommended sports events may be added as the media content of interest and further referred by the second device-assistive information for which the neural network model 104 may be retrained for the 20 years old male users.

In another exemplary scenario, in case the first user 116A is a child in the age group of 5-13 years, the circuitry 202 may recommend an interactive content (for example, related to an educational activity or a video game) to the first user 116A. For example, the circuitry 202 may be configured to render quiz content (as the first media content) which may be of interest to the first user 116A. In accordance with an embodiment, the circuitry 202 may render the first media content on the media rendering device 302 when the first user 116A has been detected in the FOV of the image-capture device 304 for a predetermined time interval. Further, the circuitry 202 may be configured to send a notification of the first media content and the time interval for which the first user 116A has viewed/listened the first media content to the computing device 110 of another user (e.g., the third user 116C) associated with the first user 116A. For example, the other user (e.g., the third user 116C) may correspond to a parent or an elder family member of the first user 116A. The circuitry 202 may also be configured to send a notification to the computing device 110 of the other user (e.g., the third user 116C) when the first user 116A may be detected as an under-age user (for example, below 18 years) and may be alone in the FOV of the image-capture device 304 for a defined time interval. In addition, the circuitry 202 may be configured to filter (or block) playback of sensitive media content (like content related to adults) on the media rendering device 302 based on the determination that the first user 116A is the under-age user (for example, below 18 years).

For example, in case of the determination of an under-age user as the first user 116A, the circuitry 202 may be configured to render the media content (for example, quiz content) which may be of interest for the first user 116A on the media rendering device 302. The circuitry 202 may further monitor a response or an interaction with the first user 116A based on user-inputs received through I/O device 208 or based on the facial expressions of the first user 116A captured by the image-capture device 304. In case, the circuitry 202 determines that the response or the interaction with the first user 116A corresponds to a positive emotion (e.g., happy, smile, joy or laughter), the circuitry 202 may continue to render the same media content (i.e. quiz content) on the media rendering device 302. Otherwise, the circuitry 202 may render another content (for example, cartoon media content) which may enhance interest with the first user 116A and may convert a negative emotion (e.g., sad, angry, boredom, or confused) of the first user 116A. to a positive emotion (e.g. happy, smile, joy or excitement).

Figure 4:
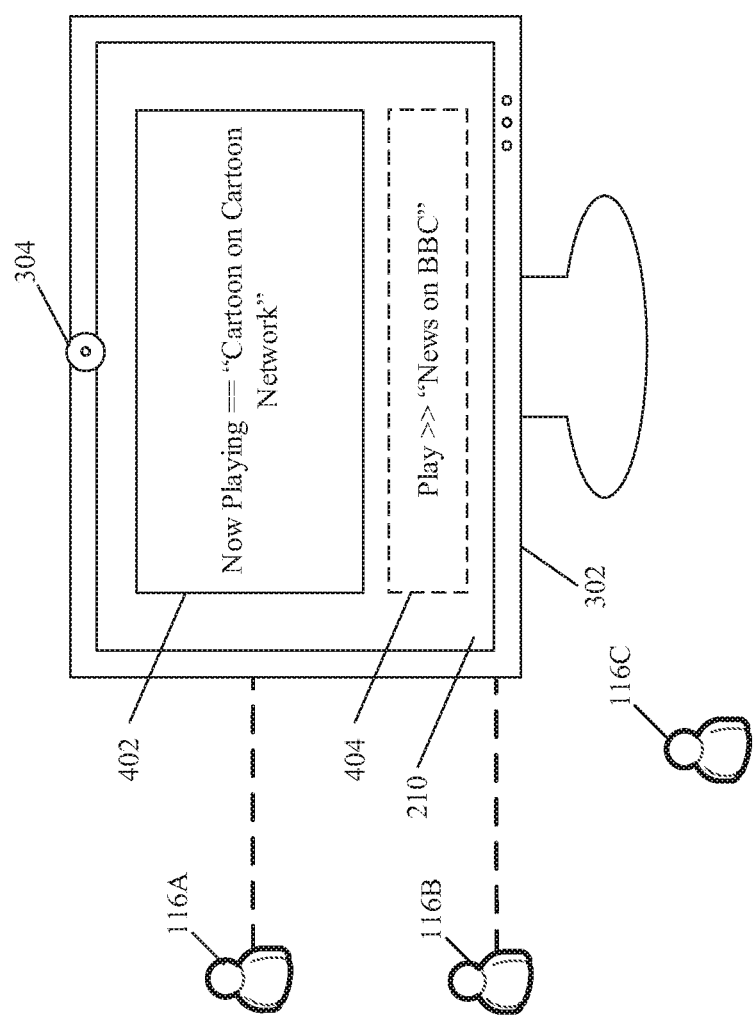
FIG. 4 is a diagram that illustrates another scenario for control of a media rendering device based on trained network model, in accordance with an embodiment of the disclosure.

FIG. 4 is a diagram that illustrates another scenario for control of a media rendering device based on a trained network model, in accordance with an embodiment of the disclosure. FIG. 4 is explained in conjunction with elements from FIGS. 1, 2, 3A, and 3B. With reference to FIG. 4, there is shown the media rendering device 302, a plurality of users (such as the first user 116A and the second user 116B), and the image-capture device 304. The plurality of users (e.g., the first user 116A and the second user 116B) may be associated with the media rendering device 302 and may be present within the FOV of the image-capture device 304 at a first point of time ($T_1$). The third user 116C may initially lie outside the FOV at the first point of time ($T_1$) but may approach towards and subsequently lie within the FOV at a second point of time ($T_2$; wherein $T_2 > T_1$).

In accordance with an embodiment, at the first point of time ($T_1$), the circuitry 202 may be configured to capture a first image of the FOV using the image-capture device 304. The first image may include one or more images associated with the plurality of users (e.g., the first user 116A and the second user 116B). In accordance with an embodiment, the circuitry 202 may be configured to determine a user-type of each of the plurality of users (e.g., the first user 116A and the second user 116B) based on the captured first image. The determination of the user-type is described, for example, in FIGS. 1 and 3A. The circuitry 202 may be further configured to determine the first device-assistive information based on the determined user-type of each of the plurality of users (e.g., the first user 116A and the second user 116B). For example, the first device-assistive information may be determined based on a common interest or a common user-type of a majority of users of the plurality of users (e.g., the first user 116A and the second user 116B). For instance, if the majority of users of the plurality of users are children, then the first device-assistive information may correspond to recommendation of, for example, a cartoon show, which may be liked by the children.

In accordance with an embodiment, the circuitry 202 may be configured to determine priority information associated with each of the plurality of users (e.g., the first user 116A and the second user 116B) or associated with the user-type of each of the plurality of users (e.g., the first user 116A and the second user 116B). The priority information of a user may correspond to, but is not limited to, a user-type of the user, authentication information registered between the user and the media rendering device 302, a current time of a day, a proximity of the user with the media rendering device 302, and a frequency of use of the media rendering device 302 by the user.

For example, a user with a user-type corresponding to an age group of 45-60 years may have a higher priority than another user with a user-type corresponding to an age group of 18-25 years. In another example, in case of detection of multiple users of common age-group (for example children at 10-15 age group), the user with highest age may be assigned higher priority among other users (for example priority may be predefined by parents to avoid any conflict between multiple users). In another example, a user who may have a personal identification number (PIN) number (i.e. authentication information) to get authenticated with the media rendering device 302 may have higher priority than the rest of the users (even if the other users are aged users). In another example, at evening time (say 5:00 PM to 8:00 PM), the children at age group of 10-15 years may have higher priority, however, at nighttime (say 8:00 PM to 12:00 AM), the adult users may have higher priority. In another example, the circuitry 202 may be configured to determine a proximity of the each of the plurality of users (e.g., the first user 116A and the second user 116B) with the media rendering device 302 based on analysis of the captured first image. A user who may be closer to the media rendering device 302 may be assigned a higher priority than the remaining users. Further, a user with a higher frequency of use of the media rendering device 302 may be assigned a higher priority than the rest of the users. In addition, factors such as usage information and power consumption information may also form a basis for determination of priority information of the plurality of users (e.g., the first user 116A and the second user 116B). For example, a user for whom the set configuration settings of the media rendering device 302 contributes to higher power consumption may have a lower priority than another user for whom the set configuration settings consume lesser power of the media rendering device 302.

In accordance with an embodiment, in case of detection of the plurality of users within the FOV of the image-capture device 304, the circuitry 202 may be configured to select a user from the plurality of users based on the priority information of each of the plurality of users. The priority information for each of the plurality of users may be stored in user-profile database 206. The user with a higher priority may be determined as the selected user (for example, the second user 116B shown in FIG. 4). The circuitry 202 may be further configured to determine a user-type or identification information of the selected user (e.g., the second user 116B) based on the captured first image as described, for example, in FIG. 3A. In accordance with an embodiment, the circuitry 202 may be further configured to determine the first device-assistive information for the selected user (e.g., the second user 116B) based on the application of the trained neural network model 104 on the user-type or the user-profile information of the selected user (e.g., the second user 116B) and may further recommend the first media content 402 (for example, "Cartoon Show" on "Cartoon Network" channel in FIG. 4) or change the configuration setting for the selected user.

For example, at the second point of time ($T_2$), the third user 116C enters into the FOV of the image-capture device 304, and the circuitry 202 may be configured to capture a second image using the image-capture device 304. The circuitry 202 may be further configured to determine a user-type or identification information of the third user 116C based on the captured second image as described, for example, in FIG. 3A. The circuitry 202 may be further configured to determine priority information of the third user 116C based on the determined user-type or the identification of the third user 116C. The circuitry 202 may be further configured to dynamically update the priority information of the plurality of users (e.g., the first user 116A and the second user 116B) based on the determined priority information of the third user 116C. Further, the circuitry 202 may re-select a user from the plurality of users (e.g., the first user 116A and the second user 116B) and the third user 116C based on the priority information of each user. For example, the third user 116C may be an aged user who may have the higher priority than the first user 116A and the second user 116B, then the circuitry 202 may select the third user 116C and further re-determine/update the first device-assistive information for the newly selected user (e.g., the third user 116C). The circuitry 202 may re-determine/update the first device-assistive information based on the application of the trained neural network model 104 on the user-type or the identification information of the newly selected user (e.g., the third user 116C).

For example, at the first point of time $T_1$, the plurality of users (e.g., the first user 116A and the second user 116B) may correspond to children in the age group of 5-13 years. In such case, the first device-assistive information for the plurality of users (e.g., the first user 116A and the second user 116B) may correspond to a "Cartoon show" that may be rendered on the media rendering device 302 as the first media content 402 based on the common interest of the first user 116A and the second user 116B, as shown, for example, in FIG. 4. In case, at the second point of time $T_2$, the circuitry 202 may detect the third user 116C who may be an adult in the age group of 35-50 years with the media interest of news shows and with higher priority than each of the first user 116A and the second user 116B. Thus, the circuitry 202 may select the third user 116C and update the first device-assistive information which may correspond to a "News show" that may be rendered on the media rendering device 302 as a second media content 404 as shown, for example, in FIG. 4 for the third user 116C.

In another example, in case, the circuitry 202 detects that one of the plurality of users is currently authenticated/logged-in with the media rendering device 302 based on the input of PIN credentials, then the circuitry 202 may assign a higher priority to that user (with PIN credentials) than all other users even if the other users may include an aged user. In such case, the circuitry 202 may control the media rendering device 302 to output the first media content or change the configuration setting based on the user-type or user-profile information of the selected user with PIN credentials.

Figure 5:
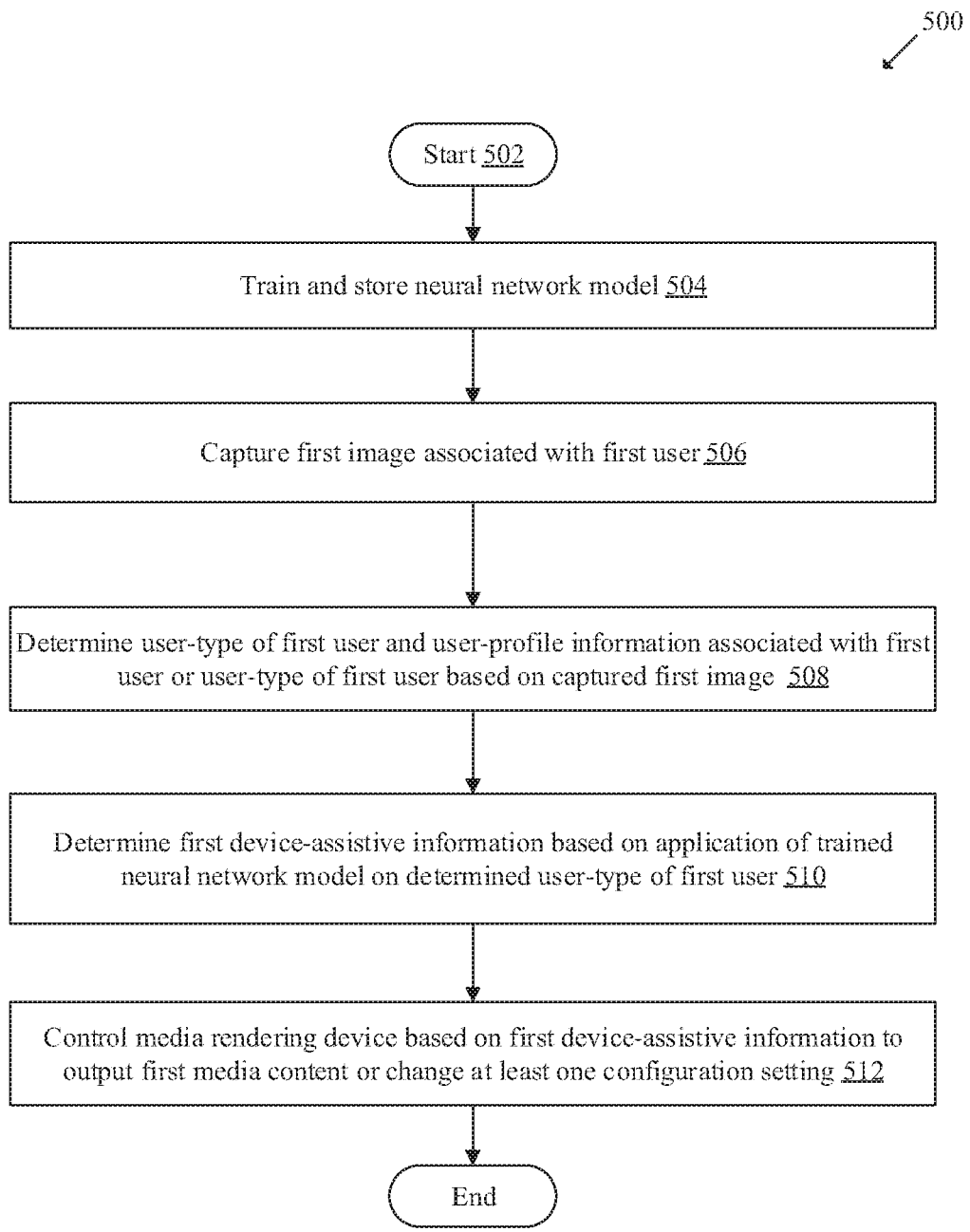
FIG. 5 is a flowchart that illustrates a first exemplary method for control of a media rendering device based on trained network model, in accordance with an embodiment of the disclosure.

FIG. 5 is a flowchart that illustrates a first exemplary method for control of a media rendering device based on trained network model, in accordance with an embodiment of the disclosure. FIG. 5 is described in conjunction with elements from FIGS. 1, 2, 3A, 3B, and 4. With reference to FIG. 5, there is shown a flowchart 500. The operations of the flowchart 500 may be executed by a computing system, such as the media rendering device 102, the media rendering device 302, or the circuitry 202. The operations may start at 502 and proceed to 504.

At 504, the neural network model 104 may be trained and stored. In one or more embodiments, the circuitry 202 of the media rendering device 302 may be configured to train the neural network model 104 and store the neural network model 104 in the memory 204. The neural network model 104 may be trained based on the user-type (e.g., age, gender, location, and emotional state) of one or more users (e.g., the first user 116A and the second user 116B) and the user-profile information (e.g., media interest, celebrity interest, or media playback history) associated with the user-type.

At 506, the first image associated with the first user 116A may be captured. In one or more embodiments, the circuitry 202 of the media rendering device 302 may be configured to capture the first image of the first user 116A using the image-capture device 106. The first image may include a facial region of the first user 116A.

At 508, the user-type of the first user 116A and the user-profile information associated with the first user 116A or the user-type of the first user 116A may be determined based on the captured first image. In one or more embodiments, the circuitry 202 of the media rendering device 302 may be configured to determine the user-type and/or the user-profile information associated with the first user 116A, based on the captured first image. The user-type of the first user 116A may correspond to, but is not limited to, an age group, a gender, an emotional state, or a geographical location, associated with the first user 116A. The user-profile information may correspond to, but is not limited to, a media content interest, a media genre interest, a celebrity interest, a preference related to a configuration setting of a media rendering device 302, a time of day preference associated with media playback, previously played media content, or a preference associated with another media rendering device. The determination of the user-type and the user-profile information is described, for example, in FIGS. 3A, and 3B.

At 510, the first device-assistive information may be determined based on application of the trained neural network model 104 on the determined user-type of the first user 116A. In one or more embodiments, the circuitry 202 of the media rendering device 302 may be configured to apply the trained neural network model 104 on the user-type of the first user 116A to determine the first device-assistive information as described, for example, in FIGS. 3A and 3B. The first device-assistive information may correspond to at least one of a set of instructions, (Uniform Resource Locator (URL) of the first media content, or address information of the memory 204 (e.g., memory location that stores the first media content). The first device-assistive information may also correspond to notification information, one or more hardware or software configuration parameters of the media rendering device 102.

At 512, the media rendering device 102 may be controlled based on the first device-assistive information to output the first media content or change the configuration settings. In one or more embodiments, the circuitry 202 of the media rendering device 302 may be configured to control the media rendering device 302 to change the at least one configuration setting of the media rendering device 302 or to output the first media content. Examples of the at least one configuration setting may include, but are not limited to, a display setting, a GUI/menu setting, a home page setting, a font setting, a color setting, network setting, security setting, an accessibility setting, an audio setting, a hardware setting, or a software setting, associated with the media rendering device 302. The control of the media rendering device 302 to output the first media content is described, for example, in FIG. 3A and the control of the media rendering device 302 to change the at least one configuration setting is described, for example, in FIG. 3B. The control may pass to end.

Although the flowchart 500 is illustrated as discrete operations, such as 504, 506, 508, 510, and 512, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 6:
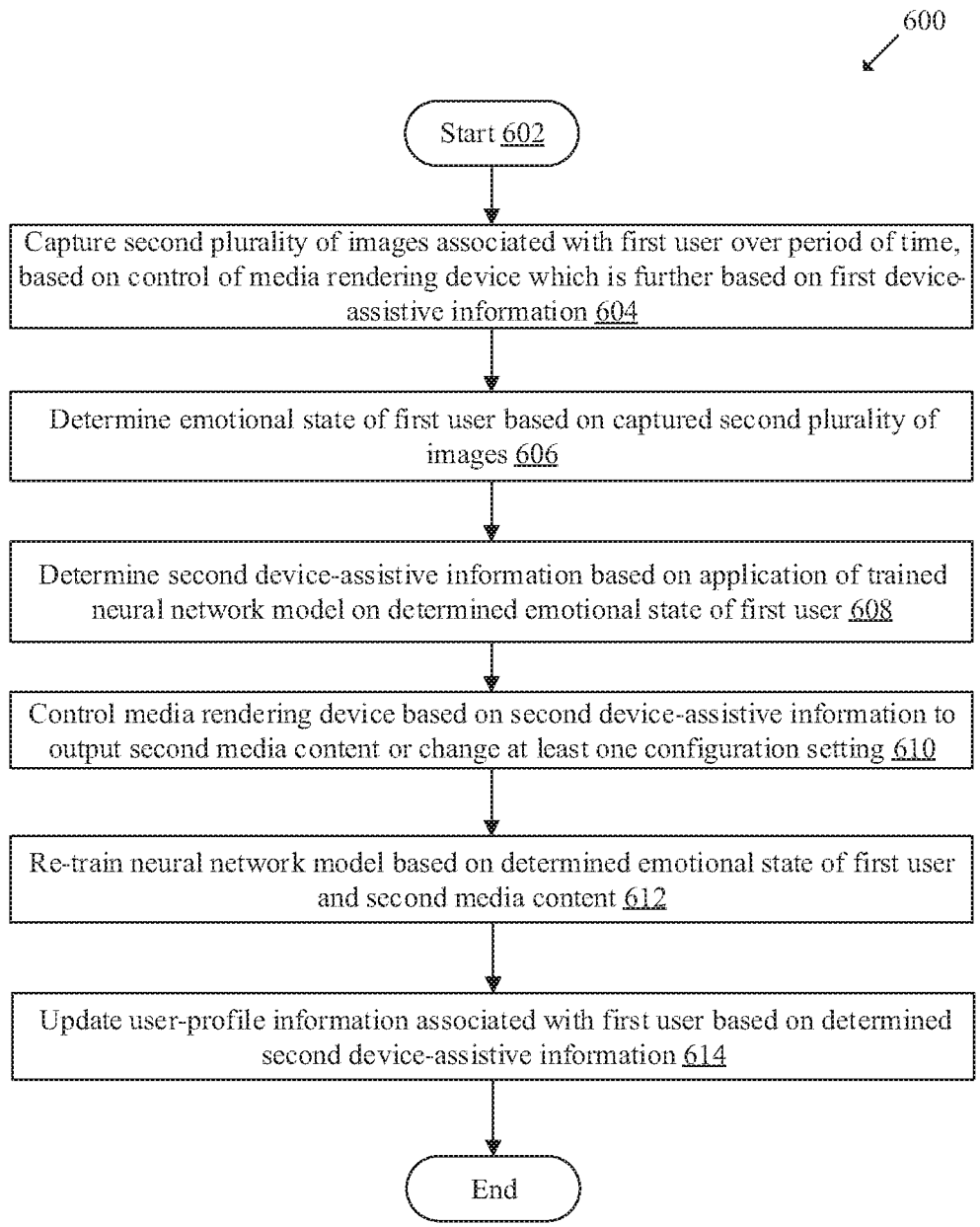
FIG. 6 is a flowchart that illustrates a second exemplary method for control of a media rendering device control based on trained network model, in accordance with an embodiment of the disclosure.

FIG. 6 is a flowchart that illustrates a second exemplary method for control of media rendering device based on a trained network model, in accordance with an embodiment of the disclosure. FIG. 6 is described in conjunction with elements from FIGS. 1, 2, 3A, 3B, 4, and 5. With reference to FIG. 6, there is shown a flowchart 600. The operations of the flowchart 600 may be executed by a computing system, such as the media rendering device 102, the media rendering device 302, or the circuitry 202. The operations may start at 602 and proceed to 604.

At 604, the second plurality of images associated with the first user 116A may be captured. In one or more embodiments, the circuitry 202 of the media rendering device 302 may be configured to capture the second plurality of images, using the image-capture device 106. The second plurality of images may be captured over a period of time, based on control of the media rendering device 302 which may be controlled based on the first device-assistive information. The capture of the second plurality of images based on the control of the media rendering device 302 is described in FIG. 3B.

At 606, the emotional state of the first user 116A may be determined based on the captured second plurality of images. In one or more embodiments, the circuitry 202 may be configured to determine the emotional state based on the facial expressions of the first user 116A as described, for example, in FIG. 3B.

At 608, the second device-assistive information may be determined based on application of the trained neural network model 104 on the determined emotional state of the first user 116A. In one or more embodiments, the circuitry 202 may be configured to apply the trained neural network model 104 on the determined emotional state of the first user 116A to determine the second device-assistive information.

At 610, the media rendering device 302 may be controlled based on the second device-assistive information to output the second media content or change the at least one configuration setting. In one or more embodiments, the circuitry 202 may be configured to control the media rendering device 302 based on the second device-assistive information to change the at least one configuration setting or to output the second media content. The control of the media rendering device 302 based on the second device-assistive information is described, for example, in FIG. 3B.

At 612, the neural network model 104 may be re-trained based on the determined emotional state of the first user 116A and the second media content. In one or more embodiments, the circuitry 202 of the media rendering device 302 may be configured to re-train the neural network model 104 based on the determined emotional state of the first user 116A and the second media content. Details related to the re-training of the neural network model 104 is described, for example, in FIG. 3B.

At 614, the user-profile information associated with the first user 116A may be updated based on the determined second device-assistive information. In one or more embodiments, the circuitry 202 of the media rendering device 302 may be configured to update the user-profile information associated with the first user 116A based on the determined second device-assistive information. Details related to the update of the user-profile information associated with the first user 116A is described, for example, in FIG. 3B. The control may pass to end.

Although the flowchart 600 is illustrated as discrete operations, such as 604, 606, 608, 610, 612, and 614, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, instructions executable by a machine and/or a computer, such as a media rendering device, for control of the media rendering device based on a trained network model. The at least one code section may cause the machine and/or computer to perform operations that include capture of a first image associated with a first user. The operations further include determination of a user-type of the first user based on the captured first image. The user-type of the first user corresponds to at least one of an age group of the first user, a gender of the first user, an emotional state of the first user, or a geographical location associated with the first user. The operations further include determination of user-profile information, associated with one of the first user or the determined user-type, based on the captured first image. The user-profile information corresponds to interests or preferences associated with the first user or with the determined user-type of the first user. The operations further include determination of first device-assistive information based on application of the trained neural network model on the determined user-type of the first user. The neural network model may be pre-trained based on the user-type and the user profile information associated with the determined user-type. The operations further include control of the media rendering device based on the determined first device-assistive information, to change at least one configuration setting of the media rendering device or to output first media content.

Exemplary aspects of the disclosure may include media rendering device (such as the media rendering device 102) configured to store a neural network model (such as the neural network model 104). The media rendering device 102 may include circuitry (such as the circuitry 202). The circuitry 202 may be configured to capture of a first image associated with a user (such as, the first user 116A). The circuitry 202 may be further configured to determine a user-type of the first user 116A based on the captured first image. The user-type of the first user 116A may correspond to, but is not limited to, an age group, a gender, an emotional state, or a geographical location, associated with the first user 116A. The circuitry 202 may be further configured to determine user-profile information, associated with one of the first user 116A or the determined user-type, based on the captured first image. The user-profile information corresponds to interests or preferences of the first user 116A or the determined user-type. The circuitry 202 may be further configured to determine first device-assistive information based on application of the trained neural network model 104 on the determined user-type of the first user 116A. The neural network model 104 may be trained based on the user-type and the user profile information associated with the determined user-type. The circuitry 202 may be further configured to control the media rendering device 102 based on the determined first device-assistive information, to change at least one configuration setting of the media rendering device 102 or to output first media content.

In accordance with an embodiment, the user-profile information may further correspond to, but is not limited to, a media content interest, a media genre interest, a celebrity interest, a preference related to a configuration setting of the media rendering device 102, a time of day preference associated with media playback, previously played media content, or a preference associated with another media rendering device. The first device-assistive information may further correspond to, but is not limited to, at least one of a set of instructions, Uniform Resource Locator (URL), address information of a memory associated with the media rendering device 102, notification information, one or more hardware configuration parameters, or one or more software configuration parameters. In accordance with an embodiment, the at least one configuration setting of the media rendering device 102 comprise, but are not limited to, a display setting, a GUI/menu setting, a home page setting, a font setting, a color setting, network setting, security setting, an accessibility setting, an audio setting, a hardware setting, or a software setting, associated with the media rendering device 102.

In accordance with an embodiment, the captured first image may include images associated with a plurality of users (e.g., the first user 116A and the second user 116B). The circuitry 202 may be further configured to determine a user-type of each of the plurality of users and determine the first device-assistive information based on the determined user-type of each of the plurality of users. In accordance with an embodiment, the first device-assistive information may be determined based on a common interest or a common user-type of a majority of users from the plurality of users (e.g., the first user 116A and the second user 116B). The circuitry 202 may be further configured to determine priority information associated with each of the plurality of users (e.g., the first user 116A and the second user 116B) or the user-type of each of the plurality of users (e.g., the first user 116A and the second user 116B). The circuitry 202 may be further configured to select a user (e.g., the second user 116B) from the plurality of users (e.g., the first user 116A and the second user 116B) based on the determined priority information. The priority information may include, but is not limited to, a user-type of each of the plurality of users, authentication information registered between each of the plurality of users and the media rendering device 102, a current time of a day, a proximity of each of the plurality of users with the media rendering device 102, a frequency of use of the media rendering device 102 by each of the plurality of users, usage information, or power consumption information. The circuitry 202 may be configured to determine the first device-assistive information, for the selected user (e.g., the second user 116B), based on the application of the trained neural network model 104 on a user-type or identification information of the selected user (e.g., the second user 116B).

In accordance with an embodiment, the circuitry 202 may be further configured to capture a second plurality of images associated with the first user 116A over a period of time, based on to the control of the media rendering device 102 based on the first device-assistive information. The circuitry 202 may be further configured to determine the emotional state of the first user 116A based on the captured second plurality of images. Further, the circuitry 202 may determine second device-assistive information based on the application of the trained neural network model 104 on the determined emotional state of the first user 116A. The circuitry 202 may be further configured to control the media rendering device 102 based on the second device-assistive information, to change the at least one configuration setting of the media rendering device 102 or to provide second media content. In accordance with an embodiment, circuitry 202 may be configured to re-train the neural network model 104 based on the determined emotional state of the first user 116A and the second media content. Further, the circuitry 202 may update the user-profile information associated with the first user 116A based on the determined second device-assistive information.

In accordance with an embodiment, circuitry 202 may be configured to select the first media content from the plurality of second media content for playback on the media rendering device 102. The selection of the first media content may be based at least on, but not limited to, one of a popularity rating of the first media content, a Television Rating Point (TRP) rating of the first media content, a current time of day, or a geographical location of the first user. Further, the circuitry 202 may be configured to provide the sorted list of the plurality of second media content including the first media content.

In accordance with an embodiment, the first media content may correspond to notification information rendered through an output device (display/speaker) of the media rendering device 102 or transmitted to the computing device 110, which may be associated with the first user 116A or another user (e.g., the third user 116C). In accordance with an embodiment, the circuitry 202 may be configured to filter playback of sensitive media content on the media rendering device 102 based on the determination of the first user 116A as an under-age user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A first media rendering device, comprising:
circuitry configured to:
   capture a first image associated with a first user;
   determine the first user as an under-age user based on the captured first image;
   determine a user-type of the first user based on the captured first image, wherein the user-type of the first user corresponds to at least one of a gender of the first user or a geographical location associated with the first user;
   determine user-profile information, associated with one of the first user or the determined user-type, based on the captured first image, wherein the user-profile information corresponds to interests or preferences associated with the one of the first user or the determined user-type of the first user;
   train a neural network model based on the user-type and the user-profile information associated with the determined user-type;
   determine first device-assistive information based on application of the trained neural network model on the determined user-type of the first user, wherein the first device-assistive information comprises at least one of a Uniform Resource Locator (URL) to access a first media content from a server, a memory address of the first media rendering device that stores the first media content, or a notification on the first media rendering device to recommend playback of the first media content;
   control the first media rendering device based on the determined first device-assistive information, to change at least one configuration setting of the first media rendering device;
   filter playback of sensitive media content on the first media rendering device based on the determination of the first user as the under-age user;

capture, a second plurality of images associated with the first user over a period of time, based on the change of the at least one configuration setting of the first media rendering device, wherein the at least one configuration setting of the first media rendering device comprises a network setting associated with the first media rendering device;

determine an emotional state of the first user based on the captured second plurality of images;

determine second device-assistive information based on the application of the trained neural network model on the determined emotional state of the first user; and control the first media rendering device based on the second device-assistive information, to change the at least one configuration setting of the first media rendering device or to provide second media content, wherein the second media content is different from the first media content.

2. The first media rendering device according to claim 1, wherein the user-profile information associated with the one of the first user or the user-type of the first user corresponds to at least one of a media content interest, a media genre interest, a celebrity interest, a preference related to a configuration setting of the first media rendering device, a time of day preference associated with media playback, previously played media content, or a preference associated with a second media rendering device.

3. The first media rendering device according to claim 1, wherein the first device-assistive information further corresponds to at least one of a set of instructions, one or more hardware configuration parameters, or one or more software configuration parameters.

4. The first media rendering device according to claim 1, wherein the at least one configuration setting of the first media rendering device further comprises one of a display setting, a GUI/menu setting, a home page setting, a font setting, a color setting, security setting, an accessibility setting, an audio setting, a hardware setting, or a software setting associated with the first media rendering device.

5. The first media rendering device according to claim 1, wherein
the captured first image includes images associated with a plurality of users including the first user, and
the circuitry is further configured to:
determine a user-type of each of the plurality of users; and
determine the first device-assistive information based on the determined user-type of each of the plurality of users.

6. The first media rendering device according to claim 5, wherein the circuitry is further configured to determine the first device-assistive information based on one of a common interest or a common user-type of a majority of users from the plurality of users.

7. The first media rendering device according to claim 5, wherein the circuitry is further configured to:
determine priority information associated with each of the plurality of users or the user-type of each of the plurality of users; and
select a user from the plurality of users based on the determined priority information associated with each of the plurality of users.

8. The first media rendering device according to claim 7, wherein the circuitry is further configured to:

apply the trained neural network model on one of the user-type of the selected user or identification information of the selected user, and
determine the first device-assistive information for the selected user based on the application of the trained neural network model on one of the user-type of the selected user or the identification information of the selected user.

9. The first media rendering device according to claim 7, wherein the priority information is further associated with at least one of authentication information registered between each of the plurality of users and the first media rendering device, a current time of a day, a proximity of each of the plurality of users with the first media rendering device, a frequency of use of the first media rendering device by each of the plurality of users, usage information, or power consumption information.

10. The first media rendering device according to claim 1, wherein the circuitry is configured to re-train the neural network model based on the determined emotional state of the first user and the second media content.

11. The first media rendering device according to claim 1, wherein the circuitry is further configured to update the user-profile information associated with the first user based on the determined second device-assistive information.

12. The first media rendering device according to claim 1, wherein the circuitry is further configured to select the first media content from a plurality of second media content for playback on the first media rendering device.

13. The first media rendering device according to claim 12, wherein the circuitry is further configured to provide a sorted list of the plurality of second media content including the first media content.

14. The first media rendering device according to claim 12, wherein the selection of the first media content is based at least on one of a popularity rating of the first media content, a Television Rating Point (TRP) rating of the first media content, a current time of day, or the geographical location of the first user.

15. The first media rendering device according to claim 1, wherein the circuitry is further configured to transmit the notification to a computing device associated with one of the first user or a second user associated with the first user.

16. A method, comprising:
in a first media rendering device that includes a processor:
capturing, by the processor, a first image associated with a first user;
determining, by the processor, the first user as an under-age user based on the captured first image;
determining, by the processor, a user-type of the first user based on the captured first image, wherein the user-type of the first user corresponds to at least one of a gender of the first user or a geographical location associated with the first user;
determining, by the processor, user-profile information, associated with one of the first user or the determined user-type, based on the captured first image, wherein the user-profile information corresponds to interests or preferences associated with the one of the first user or the determined user-type of the first user;
training, by the processor, a neural network model based on the user-type and the user-profile information associated with the determined user-type;
determining, by the processor, first device-assistive information based on application of the trained neural network model on the determined user-type of the first user, wherein the first device-assistive information comprises at least one of a Uniform Resource Locator (URL) to access a first media content from a server, a memory address of the first media rendering device that stores the first media content, or a notification on the first media rendering device to recommend playback of the first media content;

controlling, by the processor, the first media rendering device based on the determined first device-assistive information, to change at least one configuration setting of the first media rendering device;

filtering, by the processor, playback of sensitive media content on the first media rendering device based on the determination of the first user as the under-age user;

capturing, by the processor, a second plurality of images associated with the first user over a period of time, based on the change of the at least one configuration setting of the first media rendering device, wherein the at least one configuration setting of the first media rendering device comprises a network setting associated with the first media rendering device;

determining, by the processor, an emotional state of the first user based on the captured second plurality of images;

determining, by the processor, second device-assistive information based on the application of the trained neural network model on the determined emotional state of the first user; and controlling, by the processor, the first media rendering device based on the second device-assistive information, to change the at least one configuration setting of the first media rendering device or to provide second media content, wherein the second media content is different from the first media content.

17. The method according to claim 16, wherein the user-profile information associated with the one of the first user or the user-type of the first user corresponds to at least one of a media content interest, a media genre interest, a celebrity interest, a preference related to a configuration setting of the first media rendering device, a time of day preference associated with media playback, previously played media content, or a preference associated with a second media rendering device.

18. A non-transitory computer-readable medium having stored thereon, computer-executable instructions that when executed by a media rendering device, causes the media rendering device to execute operations, the operations comprising:

capturing a first image associated with a first user;

determining the first user as an under-age user based on the captured first image;

determining a user-type of the first user based on the captured first image, wherein the user-type of the first user corresponds to at least one of a gender of the first user or a geographical location associated with the first user;

determining user-profile information, associated with one of the first user or the determined user-type, based on the captured first image, wherein the user-profile information corresponds to interests or preferences associated with the one of the first user or the determined user-type of the first user;

training a neural network model based on the user-type and the user-profile information associated with the determined user-type;

determining first device-assistive information based on application of the trained neural network model on the determined user-type of the first user, wherein the first device-assistive information comprises at least one of a Uniform Resource Locator (URL) to access a first media content from a server, a memory address of the media rendering device that stores the first media content, or a notification on the media rendering device to recommend playback of the first media content;

controlling the media rendering device based on the determined first device-assistive information, to one of change at least one configuration setting of the media rendering device;

filtering playback of sensitive media content on the first media rendering device based on the determination of the first user as the under-age user;

capturing, a second plurality of images associated with the first user over a period of time, based on the change of the at least one configuration setting of the media rendering device, wherein the at least one configuration setting of the media rendering device comprises a network setting associated with the media rendering device;

determining an emotional state of the first user based on the captured second plurality of images;

determining second device-assistive information based on the application of the trained neural network model on the determined emotional state of the first user; and controlling the media rendering device based on the second device-assistive information, to change the at least one configuration setting of the media rendering device or to provide second media content, wherein the second media content is different form the first media content.

* * * * *